Figure 1:
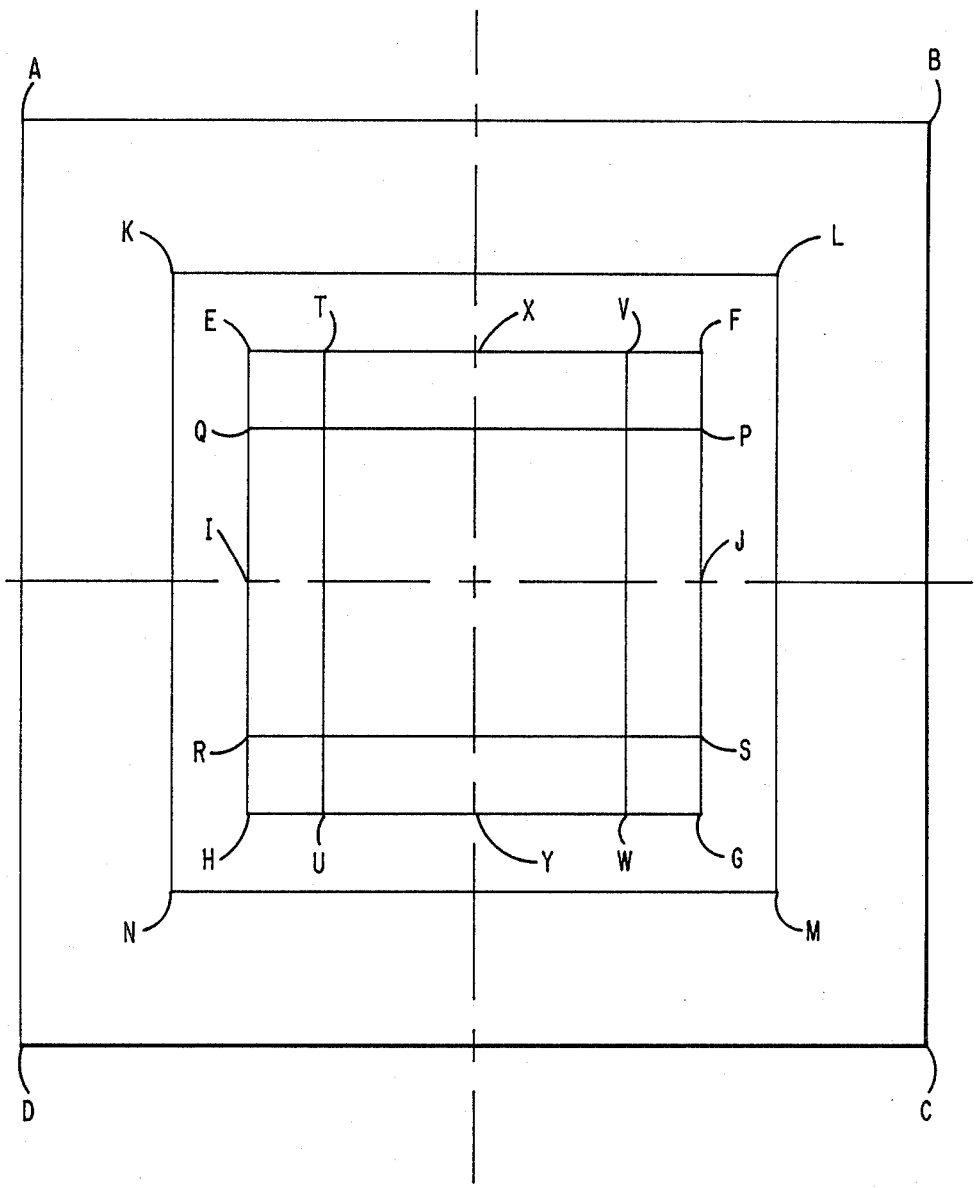

United States Patent [19]

Hayman

[11] Patent Number: 4,550,435
[45] Date of Patent: Oct. 29, 1985

[54] MULTILEVEL THRESHOLDING FOR TARGET TRACKING APPARATUS

[75] Inventor: Julius Hayman, Vincentown, N.J.
[73] Assignee: RCA Corporation, Princeton, N.J.
[21] Appl. No.: 501,869
[22] Filed: Jun. 7, 1983
[51] Int. Cl.[4] .............................................. G06K 9/34
[52] U.S. Cl. ......................................... 382/9; 382/22; 382/51; 382/52
[58] Field of Search ....................... 358/125, 126, 109; 382/9, 19, 22; 343/5 CF, 7 A; 244/3.17

[56] References Cited

U.S. PATENT DOCUMENTS 3,829,614  8/1974  Ahlbom et al. ...................... 358/126
4,409,661  9/1983  Romansky ........................... 235/411

OTHER PUBLICATIONS

Flachs et al, "An Automatic Video Tracking System", NAECON '77 Record, pp. 361–368.

Primary Examiner—Leo H. Boudreau
Assistant Examiner—Jacqueline Todd
Attorney, Agent, or Firm—Joseph S. Tripoli; George E. Haas; Allen LeRoy Limberg

[57] ABSTRACT

A method of improving segmentation of target information in video signal developed by target tracking apparatus, when the average video levels of the target and of its background surround tend to be alike.

5 Claims, 3 Drawing Figures

MULTILEVEL THRESHOLDING FOR TARGET TRACKING APPARATUS

The present invention relates to segmenting target information in the video signals developed by target tracking apparatus.

A heat-seeking missile, for example, uses target tracking apparatus of a closed-feedback-loop type to perform corrections on the path of the missile to bring it to the target. Video signals can be generated in the heat-seeking missile by an infra-red, focal-plane-array, interline-transfer charge-coupled-device camera. Adaptive-gate target tracking apparatus holds the target within the field of view (FOV) of the camera in the intermediate stages of missile flight. A rectangular "centroid gate" or "target window" is maintained around the target, its size being determined responsive to previously segmented target information. The size of the target window is made sufficiently large that all portions of the target are virtually certain to fall therewithin. A larger gate with rectangular perimeter encloses the centroid gate, but picture elements or pixels within the centroid gate are excluded from the larger gate to define a background surround around the centroid gate. A pair of edge gates are included within the centroid gate at its left and right edges, and a further pair of edge gates are included within the centroid gate at its top and bottom edges. The edge gates include those pixels in the centroid gate for which there remains reasonably high uncertainty as to whether they are descriptive of target or background.

The tracker counts the respective numbers of pixels determined to be descriptive of target rather than background in the upper and lower halves of the target window and in the right and left halves of the target window. The difference in the counts of target pixels in opposing halves of the target window is used to generate error signal for controlling missile flight, closing a feedback loop. The error signal derived from counting target pixels in the left and right halves of the target window controls flight yaw, and the error signal derived from counting the target pixels in the top and bottom halves of the target window controls flight pitch. Discrimination of target from background may take place not only on an image intensity basis, but also on the bases of intensity gradient and spatial frequency spectra of still higher order. The tracking feedback loop is of the second kind, with zero velocity error as well as zero spatial error. This provides much more accurate tracking of missile flight than a feedback loop of the first kind where velocity error is kept to zero, but spatial error is permitted. In trackers of the adaptive-gate type the dimensions of the centroid gate and of the background surround for the succeeding field scan are adjusted responsive to the counts of pixels in opposing edge gates.

In the prior art the video signal descriptive of the intensity of pixels in the centroid gate is compared to a threshold level offset from the average video signal level in the background surround. The offset is in an amount related to an expected deviation of the video signal in the background surround, (e.g. some factor times standard deviation or times mean deviation). This is done in heat-seeking target tracking apparatus, based upon the presumptions that a "hot" target is being sought against a "cooler" background and that video level is dependent on pixel "temperature". This prior art method of target segmentation is ineffective in separating a "warm" target from an alternately "hot" and "cold" background. Similar target segmentation problems occur in monochrome visual-spectrum target tracking apparatus when one wishes to identify a gray target against an alternately black and white background.

The present invention is directed to a method for segmenting targets even if they are of uniform average intensity in video signal terms and are superposed on backgrounds of alternating intensity in video signal terms. The statistics of high-intensity target pixels, the statistics of high-intensity background pixels, the statistics of low-intensity target pixels, and the statistics of low-intensity background pixels are kept track of independently. Pixels having intensities falling outside the high-intensity or low-intensity ranges of expected background intensities, are identified as likely to be descriptive of target. If the intensities of these pixels fall within high-intensity or low-intensity ranges of expected target intensities, this likelihood of their being descriptive of target can be further confirmed. This procedure allows segmenting a high-intensity target against low-intensity background and a low-intensity target against high-intensity background; moreover, a uniform average-intensity target can be segmented.

Figure 2:
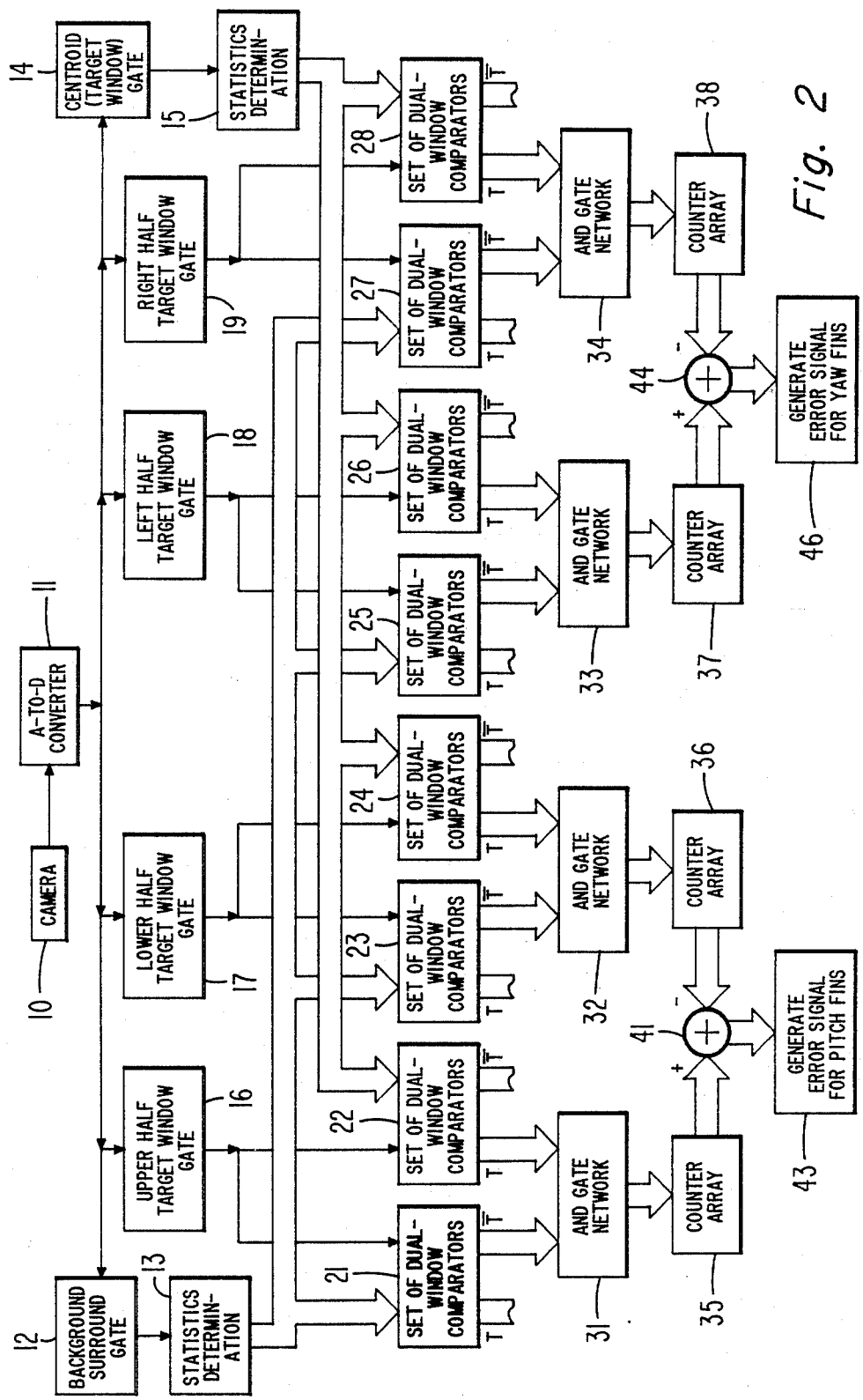
Figure 3:
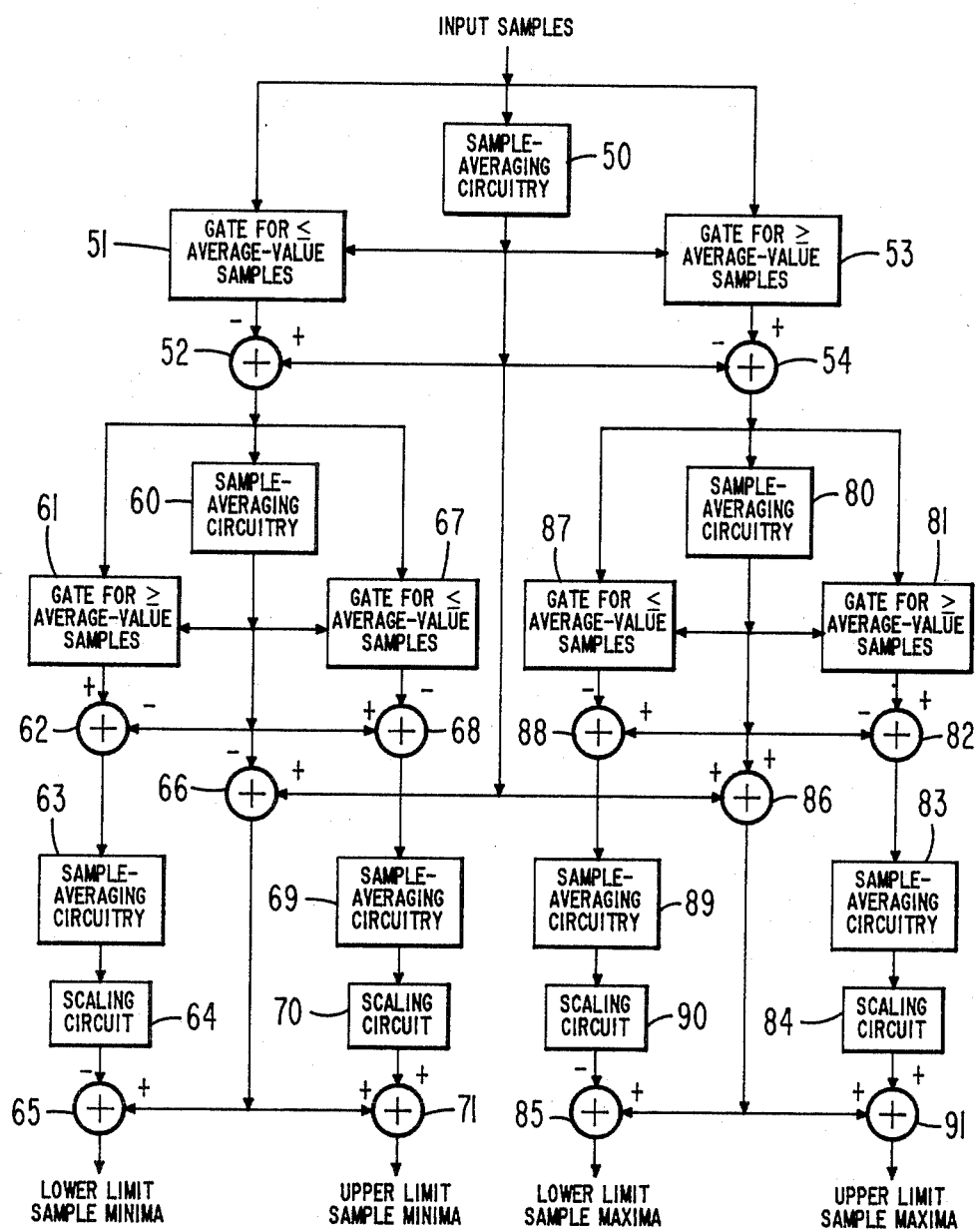

In the drawing:

FIG. 1 is a representation of the field of view of an adaptive-gate tracker camera with the positions of the centroid gate, the left and right edge gates, the upper and lower edge gates, and the background surround superposed thereon; and FIG. 2 is a block schematic diagram of representative apparatus for practicing the method of the present invention; and FIG. 3 is a detailed block schematic of circuitry used for statistic determination in the method of the invention.

FIG. 1 depicts the field of view of the tracker camera bounded by the rectangular perimeter ABCD. The area within perimeter ABCD is representative of the space raster-scanned by the camera video, such raster scanning conventionally being done pixel-by-pixel from left to right through a line trace interval with line advance in the downward direction through a field trace interval, each line advance being made during a short line retrace interval between successive line trace intervals. At the close of each field retrace interval a short field retrace interval returns raster scan from corner C to corner A.

A "centroid gate" or "target window" with rectangle EFGH as outside perimeter is centered within the field of view bounded by rectangle ABCD, and all pixel locations within the area bounded by rectangle EFGH as outside perimeter are considered to be within the target window. The rectangle EFGH is the inner boundary of a "background surround" having as its outer boundary the rectangle KLMN. Pixels in locations between the inner and outer boundaries of the background surround are presumed to be, at least predominantly, descriptive of the background surrounding the target.

The centroid gate hs an upper half within the rectangular boundary EFJI and has a lower half within the rectangular boundary IJGH. Error signals for pitch control of missile flight are generated in response to the difference in the counts of pixels determined to be descriptive of target within the rectangle EFJI and within the rectangle IJGH, respectively. The centroid gate has a left half within the rectangular boundary EXYH and has a right half with the rectangular boundary XFGY. Error signals for yaw control of missile flight are generated in response to the difference in the counts of pixels determined to be descriptive of target within the rectangle EXYH and within the rectangle XFGY, respectively. Typically, the pitch and yaw control signals are used to control the missile fins.

Within the centroid gate are an upper edge gate comprising pixel locations within the rectangle EFPQ and a lower edge gate comprising pixel locations within the rectangle RSGH. Also within the centroid gate are a left edge gate comprising pixel locations within the rectangle ETUH and a right edge gate comprising pixel locations within the rectangle VFGW. In adaptive-gate tracking the size of the centroid gate is increased as the missile approaches the target and the target fills a larger portion of camera FOV. Supposing adaptive-gate tracking to be used in the portion of the missile flight where the target does not fill the field of view bounded by rectangle ABCD, the total count of pixels determined to be descriptive of target minus the total count of pixels determined not to be descriptive of target, in the upper- and lower-edge gates (i.e., within rectangle EFPQ and RSGH) is used as an index of how much the top-to-bottom dimension of the centroid gate should be increased during the next field scan. Analogously, the total count of pixels determined to be descriptive of target in the left- and right-edge gates (i.e; within rectangles ETUH and VFGW) minus the total count of pixels determined not to be descriptive of target is used as an index of how much the left-to-right dimension of the centroid gate should be increased during the next field scan. In one tracker design, by way of example, the edge gates were four pixels wide and the background surround was three pixels wide.

The generation of the gating signals to provide for the centroid gate, the background surround gate, and the edge gates within the centroid gate is a matter of mere design for one skilled in the art of electronics design. The raster scan can be generated from the output of a counter counting regularly spaced clocked pulses for example, with the more significant bits of the counter output being used to enumerate scan lines and the less significant bits being used to enumerate pixel positions along scan line. Parallelly-timed sweep or clocking signals can be generated for operating the camera, output signal from which camera is used to generate the video signals to be subjected to gating. The counter output descriptive of raster scan can be supplied to a digital comparator network to be compared to numbers descriptive of the boundaries of the background surround gate, centroid gate and edge gates for determining whether video signal response to camera output signal is for a pixel within one (or more) of those gates.

FIG. 2 shows in block schematic form representative apparatus for segmenting target information in accordance with the invention to generate pitch and yaw error signals. A camera 10 is the source of raster-scanned video signal samples which are subsequently digitized (with some accompanying degree of amplitude quantization) in an analog-to-digital converter 11, presuming the methods of the invention to be implemented using digital electronics. The digitized video signal from A-to-D converter 11 is then partitioned as described in connection with FIG. 1 by gating circuitry as follows.

A-to-D converter 11 supplies its digitized video signal to a background surround gate 12, which segregates those pixels falling within the background surround between boundary rectangles EFGH and KLMN of FIG. 1. Statistics as to the amplitudes of the intensity of these pixels and the amplitudes of certain of their other features, for example spatial frequency and internal gradients, are calculated and used to determine likely ranges for their maxima and minima in statistics determination circuitry 13, as will be described in further detail in connection with the description of FIG. 3.

A centroid gate 14 segregates from A-to-D converter 11 digitized video signal output those pixels falling within the target window bounded by rectangle EFGH of FIG. 1. Statistics as to the amplitudes of the intensity of these pixels and the amplitudes of their other features, for example spatial frequency and internal gradients, are calculated and used to determine likely ranges for their maxima and minima in statistics determination circuitry 15, which is like statistics determination circuitry 13.

Digitized video signal from A-to-D converter 11 is supplied to the target-window half gates 16, 17, 18 and 19 which segregate pixels within the boundary rectangles EFJI, IJGH, EXYH, and XFGY, respectively, of FIG. 1. The pixels thus segregated are input signals for paired sets 21, 22; 23, 24; 25, 26; 27, 28 of window comparators, the comparator windows being in the regime of the intensity amplitudes of the pixels or the regimes of the amplitudes of their other features. Each window comparator, associated with one regime of amplitudes of samples taken from a target window half has dual windows, one established by a likely range of maximum amplitudes and the other established by a likely range of minimum amplitudes. Each output signal intensity (or its feature amplitude) from a target window half is supplied to two dual-window comparators, one having an even identification numeral and the other having an odd identification numeral. The ranges in the odd-numbered dual-window comparators are established by the statistics determination circuitry 13, and the ranges in the even-numbered dual-window comparators are established by the statistics determination circuitry 15. The initial condition used to identify a pixel as being likely to be target information is that its intensity amplitude or the amplitude of one of its other features falls outside the expected ranges of the corresponding maximum and minimum for pixels in the background surround, as determined by one of a set of dual-window comparators having its ranges determined by statistics determination circuitry 13. Further confirmation of a pixel as target information is afforded by its concurrently meeting the condition that its intensity amplitude or the amplitude of one of its other features falls within the expected ranges of the corresponding maximum and minimum for pixels in the target window defined by centroid gate 14, as determined by one of a set of dual-window comparators having its ranges determined by statistics determination circuitry 15. The concurrence of conditions is determined by ANDing the TRUE and NOT-TRUE outputs of dual-window comparators in the set 21, 22; 23, 24; 25, 26; or 27, 28 both making comparisons on the same pixel intensity or its same feature in AND gate network 31, 32, 33, or 34. The concurrences within the upper-, lower-, left- and right-window halves detected by AND gate networks 31, 32, 33 and 34 respectively are counted in each field by counter arrays 35, 36, 37 and 38 respectively. Circuitry 41 subtractively combines corresponding counts from counter arrays 35 and 36 to control the generation by circuitry 43 of pitch error signal for the fins of the missile. Circuitry 44 subtractively combines corresponding counts from counter arrays 37 and 38 to control the generation by circuitry 46 of yaw error signal for the fins of the missile.

Size adjustment of the centroid gate EFGH is made in an adaptive gate tracker by selecting portions of AND gate network 31 output signal using an upper edge gate and portions of AND gate network 32 output signal using a lower edge gate, counting the pixels in the selected regions EFPQ and RSGH of the centroid gate, identified as belonging to target, and expanding the vertical size of the centroid gate when the count of pixels identified as belonging to target exceeds a threshold value. Similarly, portions of AND gate network 33 output signal and AND gate network 34 output signal are selected by a left edge gate and a right edge gate; the pixels in the selected regions ETUH and VFGW of the centroid gate identified as belonging to target; and the horizontal size of the centroid gate is expanded when the count of pixels identified as belonging to target exceeds a threshold value.

FIG. 3 shows more specifically the nature of the statistics determination circuitry 13 or 15. Input samples, intensity or their other features, from background gate 12 in the case of statistics determination circuitry 13, or from centroid gate 14 in the case of statistics information circuitry 15, are averaged in circuitry 50 over the area within the background gate or the centroid gate. A gate 51 passes samples no larger than the average generated by circuitry 50 to an adder 52 to be subtracted from that average to generate the deviations from that average of samples no larger than that average. Gate 51 may by way of example comprise: a tristate latch receptive of input samples as input, and a digital comparator comparing input samples with the window average from circuitry 50 to enable the tri-state latch to selectively forward input samples. Similarly a gate 53 passes samples no smaller than the the window average from circuitry 50 to an adder 54 to have that average subtracted from them to generate the deviations from that average of samples no smaller than that average.

The deviations of the samples no larger than the window average are supplied to circuitry 60 for averaging these deviations over the window. A gate 61 forwards the deviations larger than average deviation to an adder 62 to have subtracted from them the average deviation supplied from circuitry 60. The difference is applied to averaging circuitry 63 to generate an average of the deviations below the average deviation of samples no larger than the window average. After scaling in circuitry 64, this result is subtracted in an adder 65 from the window average of the samples not larger than window average. This latter signal may be generated as shown by an adder 66 subtracting output signal from circuitry 60 (average deviation of samples not larger than window average) from that window average supplied as output from circuitry 50. Adder 65 output signal is used to set the lower limit of sample minima forwarded to the dual-window comparator.

A gate 67 forwards to an adder 68 deviations of the samples no larger than window average, as supplied from the output of adder 52, which deviations are smaller than the average deviation specified by averaging circuitry 60. In adder 68 these forwarded deviation are subtracted from the average deviation. The difference samples from the output of adder 68 are averaged in circuitry 69 and scaled in circuit 70 before being added back in adder 71 to the average value for smaller than average samples supplied from adder 66. The output of adder 71 is used to set the upper limit of sample minima forwarded to the same dual-window comparator as adder 65 output. Adder 65 output and adder 71 output thus define the boundaries of the window used by the dual-window comparator to determine if samples are in the region signal minima are expected to fall into.

The elements 80-91 correspond with elements 60-71 except for some of the interconnections of the adders. Elements 80-91 respond to the deviations of samples no smaller than window average and to window average to generate the lower and upper limits of the sample maxima, which are used to define the boundaries of the window used by the dual-window comparator to determine if samples are in the region signal maxima are expected to fall into. This dual-window comparator is the same one the lower window of which has boundaries defined by adder 65 output and adder 71 output.

It is worthwhile to consider the types of sample averaging to be done in circuitry 50, 60, 63, 69, 80, 83 and 89. Averaging may be done in one frame, and the results stored for use in the dual-window comparisons performed in the next frame. This facilitates averaging being done on a root-mean-square (rms) basis, so that the deviations calculated are standard deviations (or some fraction thereof after scaling in circuits 64, 70, 84, 90). The root-taking and power-taking functions associated with r-m-s averaging are time consuming unless fairly large read-only-memory look-up tables are used. Somewhat simpler and more compact digital hardware is made possible by performing running averages to the mean, instead.

It should also be noted that the distributions of samples and their deviations will tend, for samples selected either by background surround gate 12 or centroid gate 14, to depart from Gaussian shapes. The target segmentation technique described works even for severely skewed distributions, so long as the distributions for background and target differ sufficiently.

The dual thresholding technique thusfar described can be extended to a multiple thresholding technique. Circuit elements 50-54 can be viewed as a way of separating the samples into two bins, a lower-amplitude sample bin and a higher-amplitude sample bin, with sample averaging circuitry 50 establishing the boundary between the bins. The bin boundaries are then subsequently narrowed to provide limit conditions to a dual-window comparator for defining the dimensions of its windows. Analogously, one can use multiple-window comparators, separating the samples into multiple bins, then using the same technique of determining deviations of samples from the average for that bin and narrowing the bin boundaries to generate the limit conditions to be supplied to the multiple-window comparator for defining the dimensions of its windows. The boundaries between multiple bins may be initially established by determining peaks in the density of the distribution of sample amplitudes and obtaining the average for samples between those peaks. Selection of samples for each bin is done with a gate and deviations from each average are derived, after which bin narrowing proceeds analogously with the plural bin case.

What is claimed is:

1. A method for segmenting target information accompanying background information in a video signal, said method comprising the steps of:
   sampling pixels of possible target or background information;
   sampling pixels known to be, at least in predominant part, background information;
   establishing an average of the video signal intensities associated with said pixels known to be at least in predominant part background information;
   comparing each of said pixels known to be at least in predominant part background information, to the established average of their video signal intensities, for separating those of said pixels having video signal intensities greater than average from those of said pixels having video signal intensities less than average;
   accumulating statistics concerning said pixels known to be at least in predominant part background information having intensities greater than average and establishing from these statistics, without recourse to statistics concerning the intensities of target information, a range of normally expected intensities associated with high-intensity background information pixels;
   accumulating statistics concerning said pixels known to be at least in predominant part background information having intensities less than average and establishing from these statistics, without recourse to statistics concerning the intensities of target information, a range of normally expected intensities associated with low-intensity background information pixels; and
   determining whether each of said pixels of possible target or background information falls outside both said ranges of normally expected intensities associated with background information pixels to establish a likelihood of its sampling target information rather than background information.

2. A method as set forth in claim 1 including the steps of:
   sampling pixels identified as having the likelihood of being target information, rather than background information;
   establishing an average of the video signal intensities associated with said pixels identified as having the likelihood of being at least in predominant part target information;
   comparing each of said pixels identified as having the likelihood of being target information, to the established average of their video signal intensities, for separating those of said pixels having intensities greater than average from those of said pixels having intensities less than average;
   accumulating statistics concerning said pixels identified as having the likelihood of being at least in predominant part target information having intensities greater than average, to establish a range of normally expected intensities associated with high-intensity target information pixels; and
   accumulating statistics concerning said pixels identified as having the likelihood of being at least in predominant part target information having intensities less than average, to establish a range of normally expected intensities associated with low-intensity target information pixels; and
   identifying as still more likely target information those pixels already identified as having the likelihood of being target information that fall within one or both of said ranges of normally expected intensities associated with target information pixels.

3. A method for improving image segmentation in video signals containing target information, as used in target tracking apparatus, said method comprising the steps of in each of successive field scans:
   averaging the values of video signal falling within a target window to establish a first average;
   averaging the values of video signal falling within a background surround enclosing said target window to establish a second average;
   determining a third average from video signal values within said target window which are greater than said first average;
   determining a fourth average from video signal values within said target window which are less than said first average;
   determining a fifth average from video signal values within said background surround which are greater than said second average;
   determining a sixth average from video signal values within said background surround which are less than said second average;
   establishing ranges of expected deviation from each of said third, fourth, fifth and sixth averages of the signals used in their respective determination;
   setting a first threshold level at a predetermined fraction of the distance between the limits of the ranges around said third and fifth averages in the direction of increased video signal amplitude;
   setting a second threshold level at a predetermined fraction of the distance between the limits of the ranges around said third and fifth averages in the direction of decreased video signal amplitude;
   setting a third threshold level at a predetermined fraction of the distance between the limits of the ranges around said fourth and sixth averages in the direction of increased video signal amplitude;
   setting a fourth threshold level at a predetermined fraction of the distance between the limits of the ranges around said fourth and sixth averages in the direction of decreased video signal amplitude;
   identifying portions of video signal which are within said target window as target if those video signal portions are between said first and second threshold levels or between said third and fourth threshold levels, if the range around the fifth average falls within the range around the third average, and if the range around the sixth average falls within the range around the fourth average; and
   defining the target window for the next field scan and its background surround by prediction from the positioning of those portions of the video signal identified as target.

4. A method for segmenting target information accompanying background information in a video signal, said method comprising the steps of:
   sampling pixels of possible target or background information;
   sampling pixels known to be, at least in predominant part, background information;
   accumulating statistics concerning the density of distribution of the amplitudes of said background information;
   establishing boundaries of ranges containing amplitudes of said background information in localized peak portions of that distribution, in a plural thresholding technique not depending upon statistics concerning the intensities of target information pixels; and identifying, as having a likelihood of being target information, each of said pixels of possible target or background information which fall outside all these ranges.

5. A method as set forth in claim 4 including the steps of:

sampling pixels identified as having the likelihood of being target information, rather than background information;

accumulating statistics concerning the density of distribution of the amplitudes of said pixels identified as having the likelihood of being target information;

establishing boundaries of ranges containing amplitudes of said pixels identified as having the likelihood of being target information in the localized peak portions of the distribution of the amplitudes of those said pixels, in a plural thresholding technique not depending upon statistics concerning the intensities of background information pixels; and identifying as still more likely target information those pixels identified as having a likelihood of being target information in the denser portions of the distribution of the amplitudes of those said pixels.

* * * * *